United States Patent

[11] 3,593,428

| [72] | Inventor | Sydney Jacoff |
| | | Mineola, N.Y. |
| [21] | Appl. No. | 762,884 |
| [22] | Filed | Sept. 26, 1968 |
| [45] | Patented | July 20, 1971 |
| [73] | Assignee | Great Neck Saw Manufacturers, Inc. |
| | | Mineola, N.Y. |

[54] SPIRIT LEVEL
9 Claims, 10 Drawing Figs.

[52] U.S. Cl. ..................................................... 33/211
[51] Int. Cl. ........................................................ G01c 9/24
[50] Field of Search ............................................ 33/211, 207

[56] References Cited
UNITED STATES PATENTS

| 1,225,132 | 5/1917 | Johnson | 33/207 |
| 2,576,202 | 11/1951 | Wullschleger | 33/211 |
| 2,646,628 | 7/1953 | Shaler | 33/211 |
| 2,810,206 | 10/1951 | Ziemann | 33/211 |
| 2,948,066 | 9/1960 | Rosenholm | 33/207 |
| 2,993,281 | 7/1961 | Dock | 33/211 |
| 3,311,990 | 4/1967 | Wright | 33/211 |
| 3,456,354 | 7/1969 | Wright | 33/211 |
| 876,720 | 1/1908 | King | 33/211 |
| 2,502,235 | 3/1950 | Schultes | 33/213 |

*Primary Examiner*—Leonard Forman
*Assistant Examiner*—Dennis A. Dearing
*Attorney*—Norman N. Holland ABSTRACT: The present invention comprises a spirit level in which the vial thereof has a cylindrical outer surface and a curved inner surface. The curved inner surface is formed during the molding of the vial by taking advantage of the memory and natural resiliency of the plastic used.

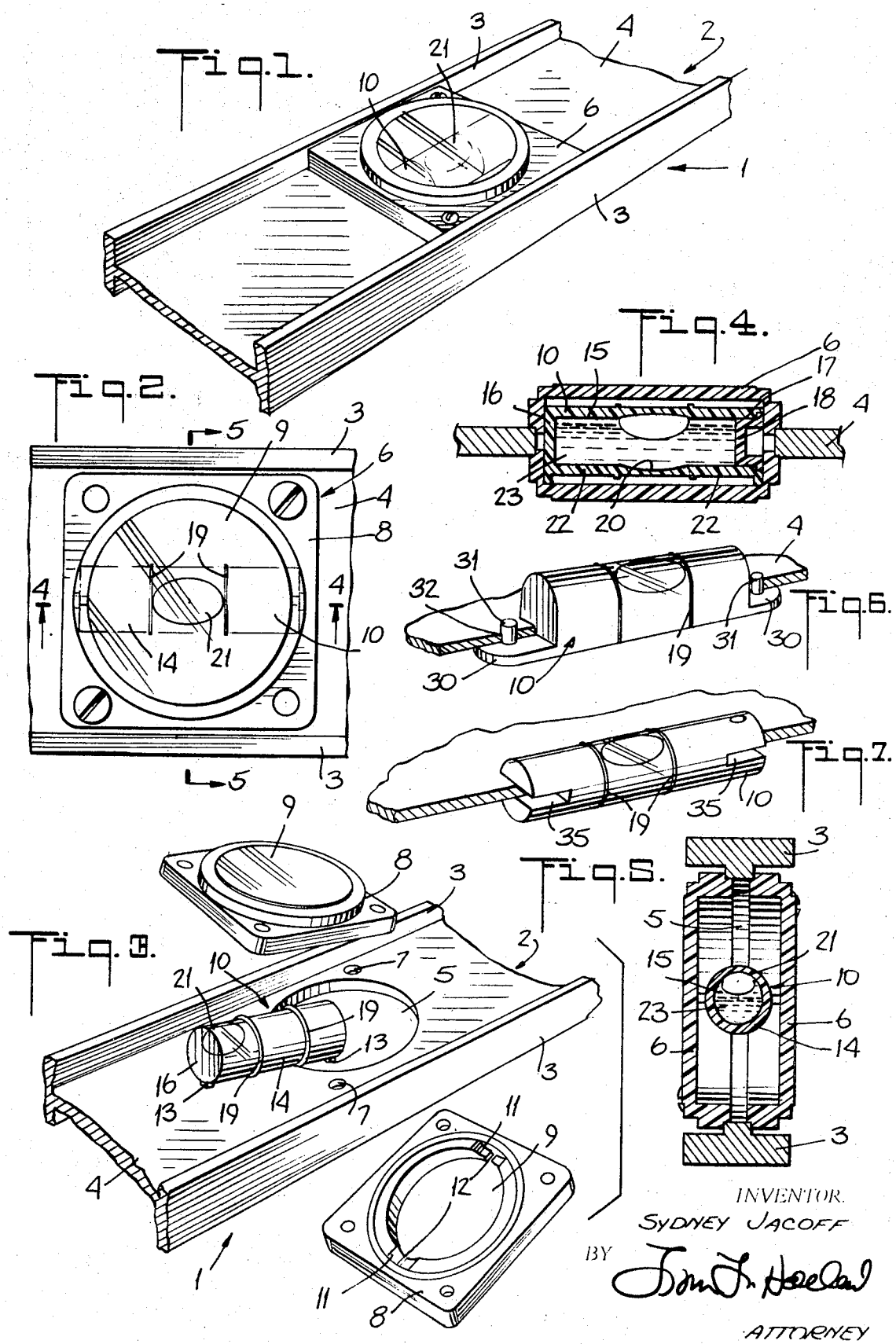

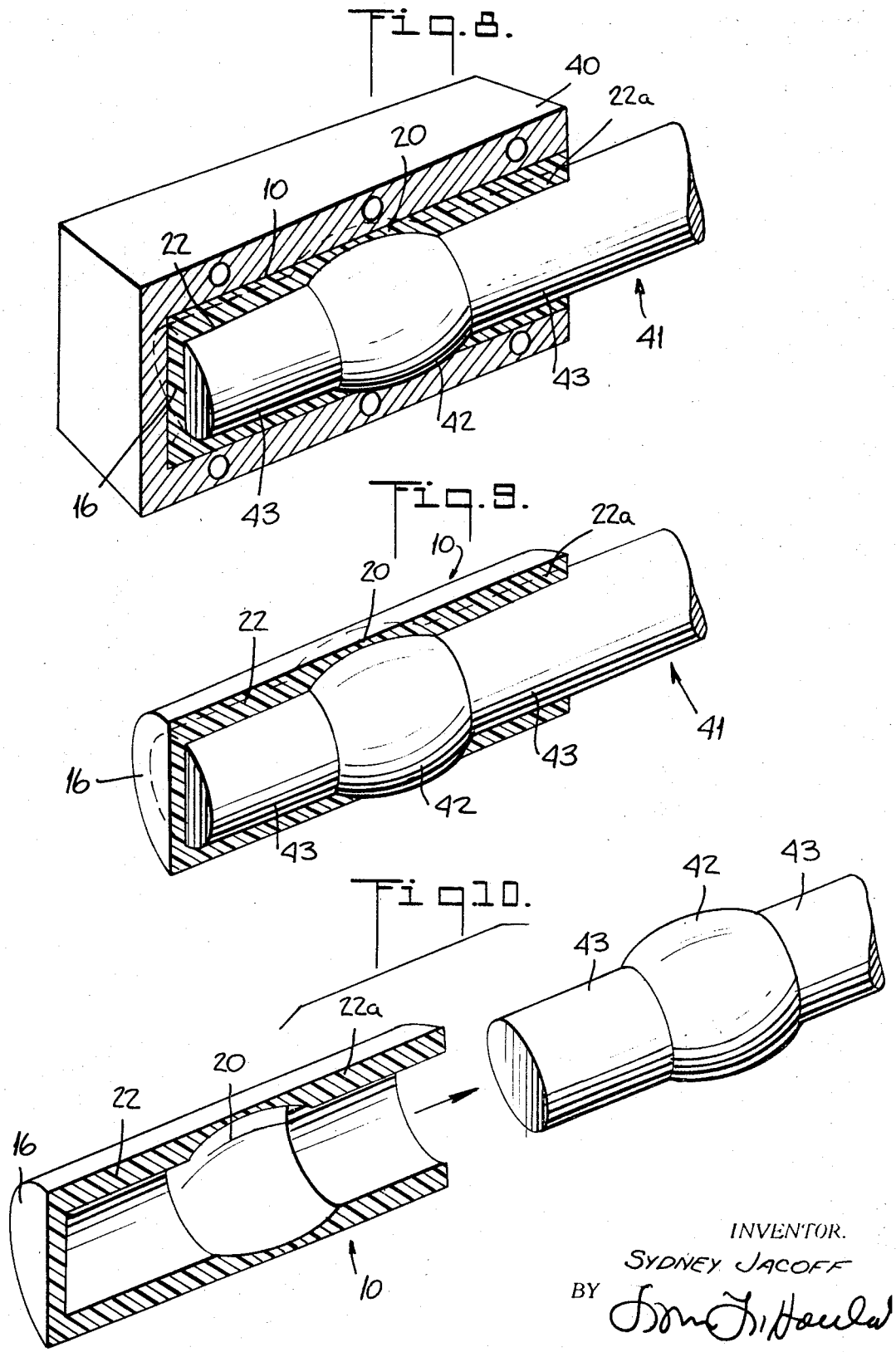

SPIRIT LEVEL

The present invention relates to a spirit level and more particularly to an improved spirit level for accurately determining the level of surfaces and the like.

Heretofore a number of spirit levels have been designed for this purpose. Some of these levels require curved level vials. Other levels in use are provided with level vials which have a cylindrical exterior and an internal curved cavity which permits the air bubble therewithin to remain uppermost. However, such level vials have heretofore been molded and the curved interior of each vial is formed separately by machining the interior. This is a costly operation so that the cost of present spirit levels is increased substantially.

The present invention avoids these drawbacks and provides an improved spirit level which is easy to use and simple to manufacture.

Another object of the present invention is the provision of an improved level vial which can be easily mounted in place without special machinery.

Another object of the present invention is the provision of an improved level vial in which the air bubble can be easily seen.

Another object of the present invention is the provision of an improved level vial which can be automatically mounted in the proper position both axially and radially without special tools.

Another object of the present invention is the provision of an improved method of making the level vial.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a perspective view showing a spirit level made in accordance with the present invention;

FIG. 2 is a fragmentary plan view thereof;

FIG. 3 is an exploded view showing the position of the various components of the level;

FIG. 4 is a sectional view taken along line 4—4 of FIG. 2;

FIG. 5 is a sectional view taken along line 5—5 of FIG. 2;

FIG. 6 is a perspective view showing another embodiment of the present invention;

FIG. 7 is a perspective view showing another embodiment of the present invention;

FIG. 8 is a sectional view showing the first step in the preferred method of forming the level vial;

FIG. 9 is a perspective view showing another step in the formation of the level vial; and FIG. 10 is a similar view showing the last step in the formation of the level vial.

Referring more particularly to the drawings the spirit level 1 comprises a body 2 in the shape of an I-beam having parallel opposed bearing surfaces 3 connected by a web 4. The web 4 is provided with at least one opening 5 therein. On each side of the opening 5 a vial cover 6 is provided between which is mounted a level vial 10. The web 4 has a plurality of holes 7 surrounding opening 5 which permits the cover portions 6 to be attached thereto.

Each cover portion 6 comprises a transparent border area 8 with a circular viewing area 9. Along the edge of the viewing area 9 a curved vial-receiving journal surface 11 is formed which is adapted to receive vial 10. At least one of the curved receiving surfaces may be provided with a slot 12 to receive a key 13 which may extend from the vial 5.

Each level vial 10 has an outside cylindrical surface 14 and is molded from a plastic material, which may be an acrylic composition. The vial is hollow and has one end 16 closed and its other end 17 open and adapted to be plugged by a suitable plug 18. Spaced raised ridges 19, equidistant from the ends of the vial, are provided to act as level indicators.

The internal configuration of the vial 10 comprises a pair of substantially straight cylindrical end portions 22 between which is interposed a curved central portion 20 which acts to accommodate the air bubble 21 therewithin. The air bubble 21 is formed by inserting fluid 23 into the vial having a volume less than the internal volume of the vial. Preferably the vial is made of an amber color to facilitate seeing the air bubble.

In assembling the vial, the fluid 23 is first inserted therein and the vial is plugged by the plug 18. The vial is then mounted on the cover 6 by inserting the key 13 into slot 12 in curved surface 11. The covers are then mounted on the web 4 over the opening 5.

FIG. 6 shows an alternate construction whereby the vial 10 has a pair of flanges 30 extending therefrom. Each flange 30 is provided with a pin 31 adapted to be inserted into openings 32 in the web 4.

In FIG. 7 another construction is shown whereby the vial 10 is provided with slots 35 which are inserted into the web 4.

The preferred method of forming the vial of the present invention is shown in FIGS. 8 to 10. The vial 10 is molded in a mold 40 by a plunger 41 which has a bulged portion 42 interposed between straight end portions 43. At the same time that the vial is molded, the inner end 16 of the vial is closed. Thus the barrel-shaped cavity 20, the straight portions 22 and the closed end 16 are all formed simultaneously.

The vial and the plunger are removed from mold 40 and thereafter the plunger 41 is removed. The plastic material that forms the vial has a certain resiliency and memory. When the plunger 41 is removed from within the vial cavity, the straight wall 22a portion will be distorted by passage of bulge 42 therethrough. However, the natural resiliency and memory of the plastic material will cause wall 22a to resume its original straight shape. The center portion will remain curved and will form the barrel-shaped interior cavity 20 that will accommodate the air bubble. Hence, in a single operation the vial is formed having a cavity with substantially straight end portions 22—22a and a curved inner portion 20. This eliminates the necessity of machining the vial as has heretofore been necessary.

It will thus be seen that the present invention provides an improved easy-to-read level which is easier to use and which can be easily mounted into place without special machinery and without special skill. The present invention also provides an improved method of making a level vial. As many widely different embodiments of this invention may be made without departing from the spirit or scope of this disclosure, it is to be understood that the invention is not to be limited to the several specific embodiments disclosed herein except to the extent necessitated by the appended claims.

Having thus described my invention, I claim:

1. A spirit level comprising a reference surface and a body portion, an opening in said body portion, a single vial mounted in said opening, said vial comprising a substantially straight cylindrical outer surface and a bore, said bore having a portion thereof curved away from the internal axis of the vial, a pair of covers, each of said covers having a transparent viewing area and an integral surrounding rim area on a plane offset from the plane of the viewing area, said rim area having a portion adapted to be attached to said body portion whereby each of said covers is held in place, and each cover being provided with diametrically opposed concave, curved receiving areas in its rim area to receive the opposed ends of the vial so that the vial is received between said pair of covers, at least one of said diametrically opposed concave, curved receiving areas having a slot and said vial having a key extending therefrom, said slot being adapted to accommodate said key for preventing movement of the vial relative to the cover portion.

2. A spirit level as claimed in claim 1, wherein a pair of raised ridges is provided on the surface of said vial.

3. A spirit level as claimed in claim 1, wherein the vial is made of a transparent plastic material.

4. A spirit level as claimed in claim 1, wherein the interior of said vial has a pair of straight portions with a curved portion interposed therebetween.

5. A spirit level as claimed in claim 4, wherein said vial has a closed end integral with the outer surface thereof.

6. In a spirit level having a cover with key-receiving slots, a spirit level vial comprising a generally cylindrical plastic transparent outer body, a bore within said body, one end of said vial having a wall integral with and one piece with the body and closing one end of the bore, the other end of the bore being open, said bore having a portion thereof curved away from the internal axis of the vial, spaced keys integral with and extending outwardly from the outer body portion of the vial adjacent the ends thereof for reception in cooperating relation in the key-receiving slots to prevent rotational movement of the vial, said spaced keys being in longitudinal alignment with each other.

7. A vial as claimed in claim 6, wherein the interior of said vial has a pair of straight portions with a curved portion interposed therebetween.

8. A vial as claimed in claim 6, wherein the opposite end of the vial is closed by a plug.

9. A spirit level as claimed in claim 5, wherein the opposite end of the vial is closed by a plug.